Inventor
J. V. Foll
By Glascock Downing & Seebold
Attys.

Inventor
J. V. Foll
By Glascock Downing & Seebold
Attys

Dec. 17, 1957

J. V. FOLL 2,816,955

FACSIMILE RECEIVER

Filed Aug. 23, 1954

5 Sheets-Sheet 3

Inventor
J. V. Foll
By Glascock Downing & Seebold
Attys.

Dec. 17, 1957 J. V. FOLL 2,816,955

FACSIMILE RECEIVER

Filed Aug. 23, 1954 5 Sheets-Sheet 4

Inventor
J. V. Foll
By Glascock Downing & Seebold
Attys

Inventor
J. V. Foll
By Glascock Downing & Seebold
Attys.

2,816,955
Patented Dec. 17, 1957

2,816,955

FACSIMILE RECEIVER

John Victor Foll, Beckenham, England, assignor to Muirhead & Co. Limited, Beckenham, England Application August 23, 1954, Serial No. 451,340

Claims priority, application Great Britain August 27, 1953

9 Claims. (Cl. 178—7.4)

This invention relates to facsimile receivers and more especially to that class of facsimile receiver which is arranged for distant reception of a picture which is to be recorded accurately in form and tone value as between white and black. The term "picture" in this context is intended to include any material which may be transmitted and received by such a system; e. g. tone pictures, artists' drawings, line drawings and charts or diagrams of any description whether hand-written, type-written or printed. The transmitter and receiver may be linked by wire or radio.

A photographic process is usually employed for the recording of such pictures and although the invention is not limited to receivers employing light sensitive material, such a receiver (that is to say, a photo-telegraph receiver recording on a drum) is referred to in the following description.

An object of the invention is to provide a phototelegraph receiver which may be left unattended, either connected permanently to a net-work or arranged to be connected by manual or automatic means, and will start up in response to a signal received from the network, record the picture and shut down again when this has been received. The machine is then in readiness to receive the next picture.

In the known art provision is made for starting, phasing and adjusting the recorded signal to the correct level by automatic means but known machines do not provide for the automatic recording of a plurality of pictures which may be received immediately following one another or at intervals of time.

The invention provides a facsimile receiver of the kind referred to including a recording drum, sufficiently long to enable a plurality of pictures to be recorded, and automatic means for starting and stopping the receiver at the beginning and end of each picture. The starting and stopping may conveniently include the opening and closing of a shutter on the light-tight box enclosing the recording drum which carries the light-sensitive material.

In order to avoid making the recording drum inconveniently long the diameter may be made smaller than is normal so that the pictures are smaller, but the original index of co-operation is maintained and the ratio of length to width is unchanged. As an example of such a reduction, the recording drum, which for the reception of three normal pictures would be 3.52 inches in diameter and 30 inches long, may be reduced to 1.7 inches in diameter and 10 inches long and the fineness of scanning altered from 100 lines per inch to 300 lines per inch; such pictures may, if required, be enlarged by normal optical means after reception.

In machines of the kind referred to the signal consists of a carrier modulated in accordance with the tone of the area of the picture which is being scanned in the transmitter. As is well known in the art, the carrier amplitude may be a maximum for a "white" signal and a minimum for a "black" signal or vice versa. The signal may be "inverted" in the receiver if desired; thus a positive original in the transmitter may be reproduced as a positive by the receiver or as a negative from which positive copies may be taken later.

The description which follows, and the accompanying drawings, cover a preferred form of construction and an arrangement of control apparatus which assumes that a positive is being transmitted, that the carrier amplitude is a maximum for white and a minimum for black and that the receiver is to produce a negative which may, for example, be recorded on photographic film used to produce positive copies by photographic printing or enlarging. It will be understood by those versed in the art that the machine may be arranged for any other operating conditions without going outside the scope of the invention.

Figure 4:
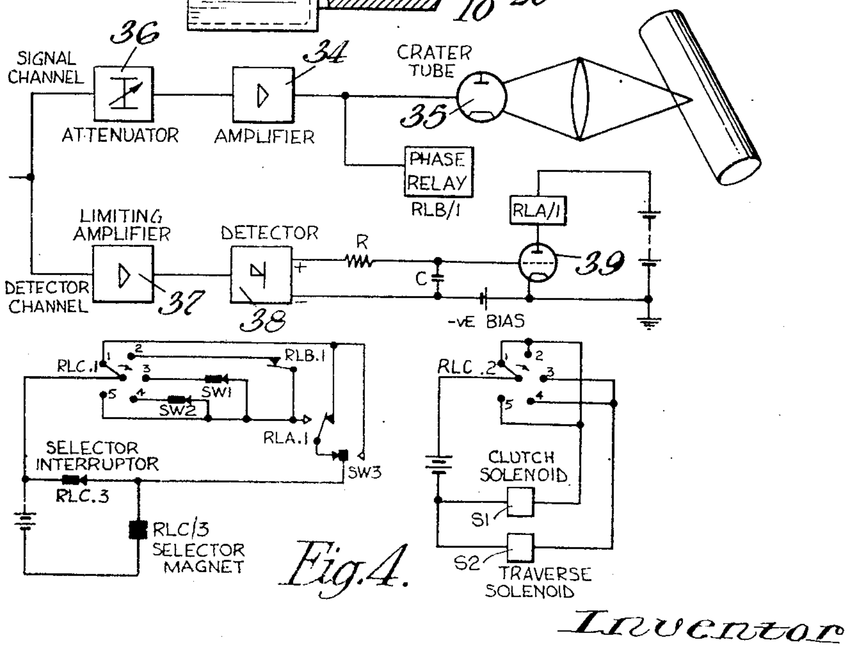
Figure 4 is a schematic diagram of the electrical circuits.
Figure 5:
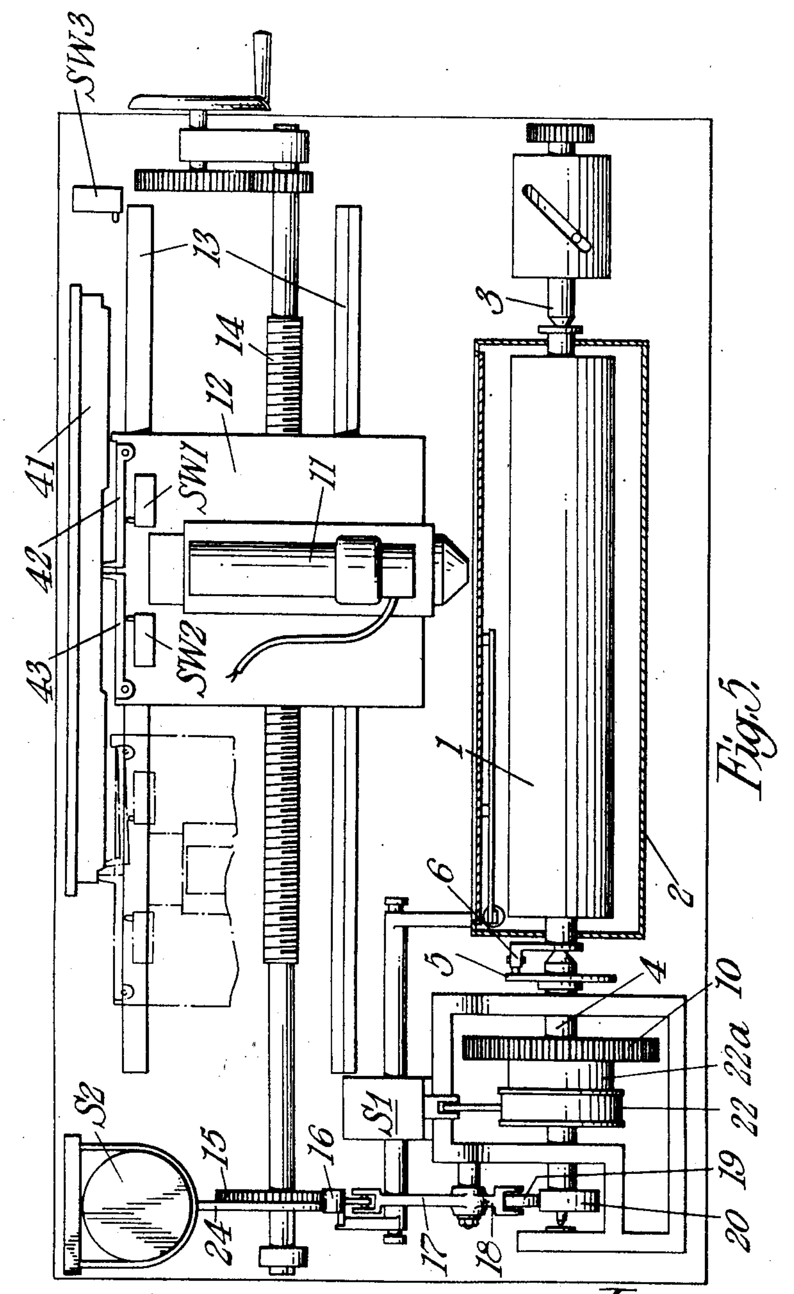
Figure 5 is a view corresponding to Figure 1 of a receiver adapted to the reception of three pictures.
Figures 3, 6:
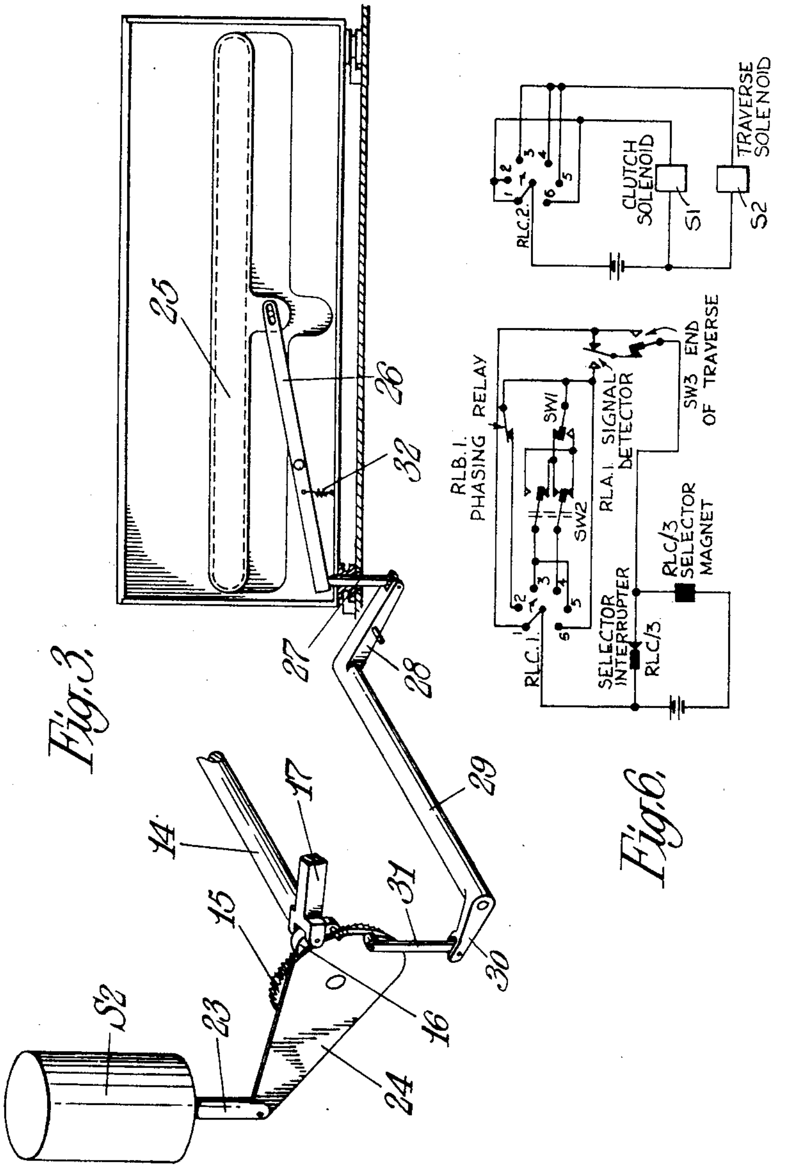
Figure 3 shows a detail in perspective view.

Figure 6 indicates the modification required in Figure 4 for the arrangement of Figure 5.

Figure 7:
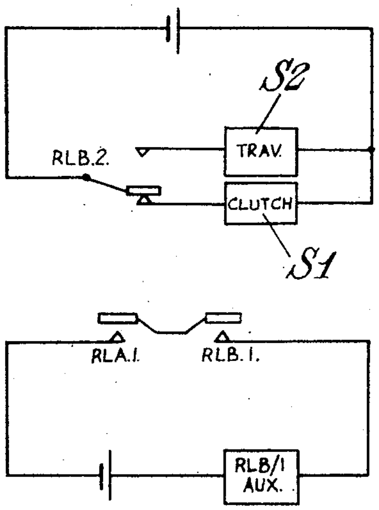
Figure 8:
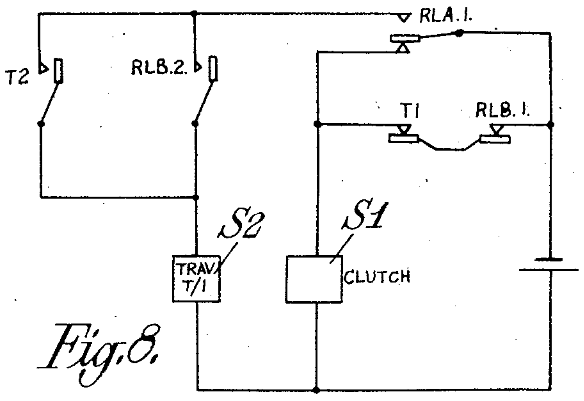

Figures 7 and 8 indicate modifications of the circuit of Figure 4 where it is not required to divide the picture space into a predetermined number of pictures.

Figure 1:
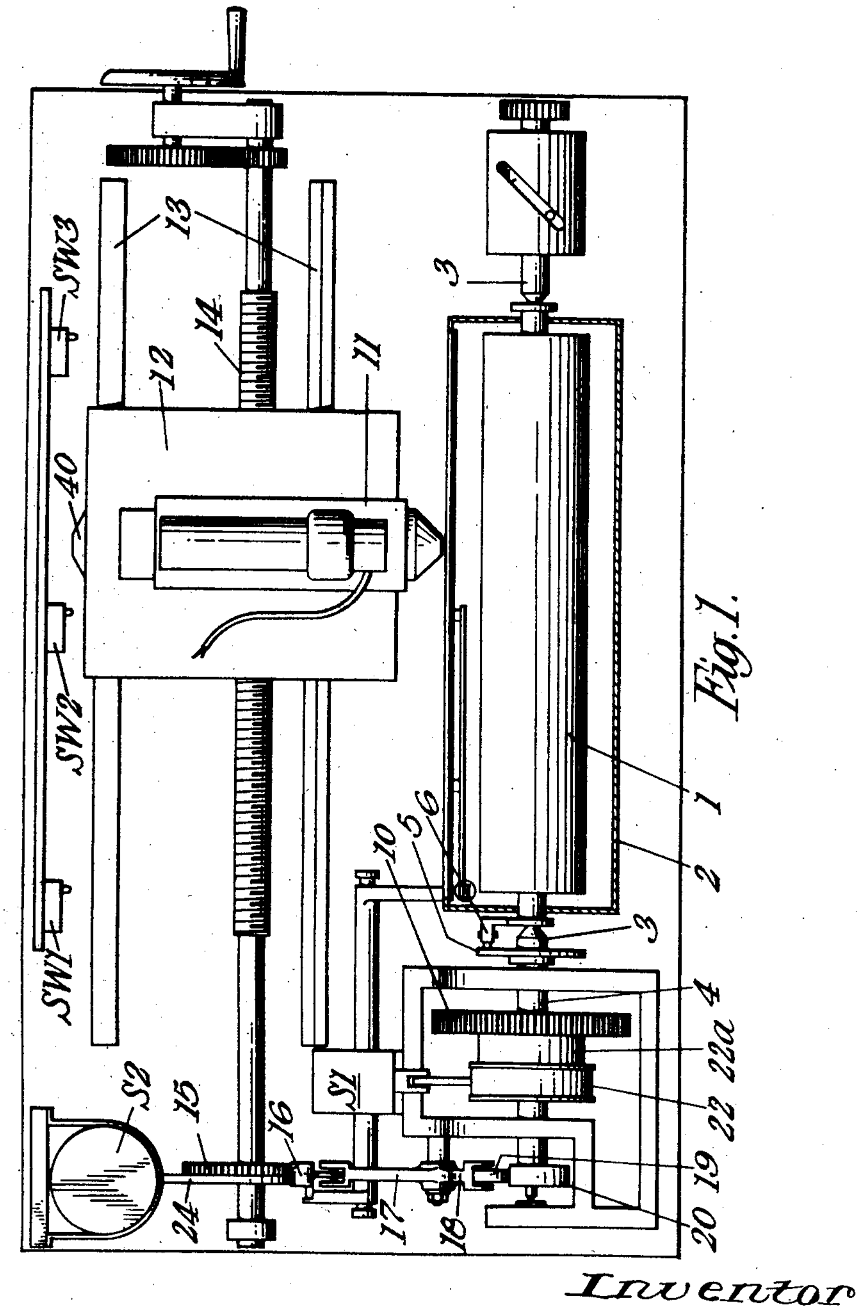
Figure 1 is a part sectional plan view of a receiver adapted to receive two pictures.
Figure 2:
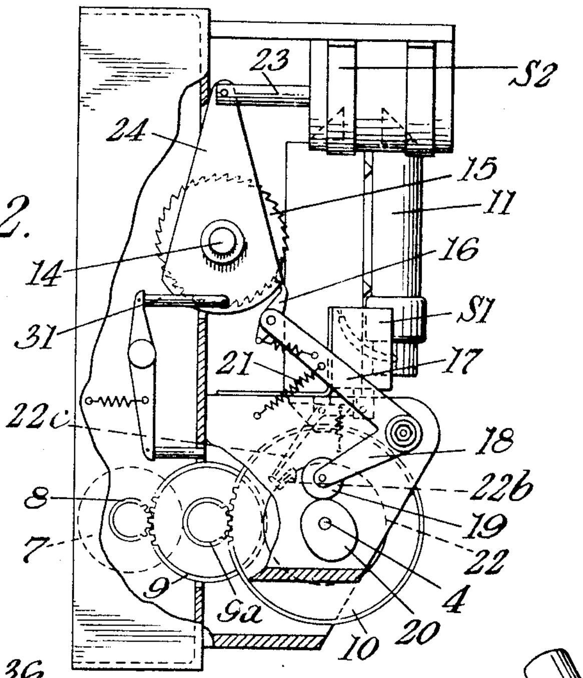
Figure 2 is a cut away side elevation of the same end.

Referring to Figures 1, 2 and 3 the recording drum 1, enclosed in light-tight box 2, is supported by centres 3. The light-tight box 2 is supported on the base of the machine and drum 1 is rotated in synchronism with driving shaft 4 by means of driving plate 5 and dog 6.

A synchronous motor 7 drives gear 10 through speed reducing gear train 8, 9, 9a. Gear 10 is coupled by dog-clutch 22 to shaft 4 over resilient means 22a to ensure that when the clutch is engaged the motor is not pulled out of synchronism. The clutch is arranged so that when disengaged by solenoid S1 driving shaft 4 is stopped in a predetermined position.

A recording head 11 mounted on carriage 12 is carried on rails 13. A nut (not shown) attached to carriage 12 engages lead screw 14. Ratchet wheel 15 secured to lead screw 14 is engaged by pawl 16 carried on one arm 17 of a bellcrank; the other arm 18 of this bellcrank carries a roller 19 which acts as a follower to cam 20 mounted on driving shaft 4. A tension spring 21 urges the bellcrank towards cam 20 to keep roller 19 in contact with it. Rotation of shaft 4 causes the bellcrank to reciprocate under the influence of cam 20 and pawl 16 engaging ratchet wheel 15 rotates lead screw 14, thus traversing the carriage 12 stepwise along the rails 13.

The dog-clutch 22 coupled to gear 10 has toothed engagement controlled by a pawl 22b operated by one end of a bellcrank lever 22c the other end of which is connected to the armature of the solenoid S1. The armature 23 of a second solenoid S2 is coupled to mask 24 mounted co-axially with lead screw 14 and arranged so that, in the outer position of armature 23, mask 24 holds pawl 16 out of engagement with ratchet wheel 15. A shutter 25 on light-tight box 2 is acted upon by the linkage 26, 27, 28, 29, 30, 31, and is urged towards the closed position by tension spring 32. Thus when solenoid S2 is energised, armature 23 is drawn into it and mask 24 is rotated to clear pawl 16. The movement of mask 24 opens shutter 25.

The arrangement by which shutter 25 is kept closed except during actual picture transmission is advantageous in that the machine may be opened at any time, other than during transmissions, for inspection of for the removal of light-tight box 2 to the darkroom for unloading and reloading, and the machine may be left standing for long periods between transmissions with crater lamp 35 alight (but not under the control of a signal) without fear of fogging the light sensitive material on drum 1.

Figure 4 is a schematic diagram of the electrical circuits. Signals received through the line (which may alternatively be the termination of a radio link) are applied to a signal channel and a detector channel. The signal channel comprises amplifier 34 and crater lamp or tube 35 which is contained in recording head 11. A phase relay RLB/1 is also connected to the output side of amplifier 34. Attenuator 36 is placed between amplifier 34 and the line to enable the receiver to be adjusted to differing line characteristics.

The signal passing into the detector channel is applied to a limiting amplifier 37 which provides an output signal of substantially constant amplitude whenever a picture carrier is received over the line. Amplifier 37 may be tuned to the picture carrier. The output from limiting amplifier 37 is applied to detector 38 which provides a direct positive voltage and this is applied to the grid valve 39 through resistance R and capacitance C. Valve 39 is negatively biassed to a point near its cut-off, so that the anode current flowing through relay RLA/1 is small. The resistance R and capacitance C are chosen to provide a long time constant (for instance 2 or 3 seconds) to ensure on the one hand that relay RLA/1 is not operated by spurious impulses on the line during a period of a no signal and on the other hand that relay RLA/1 is not released by a momentary failure of signal during a message period.

RLC.1 and RLC.2 are two arms of a rotary selector switch operated by selector magnet RLC/3 and interrupter RLC.3 so that when the selector is energised the contact arms rotate stepwise to each contact in turn, but may be held in any position by short circuiting the interruptor contacts.

Three switches SW1, SW2 and SW3 mounted on the receiver at the rear of carriage 12 are operated by cam 40 attached to carriage 12.

The operation of the receiver is as follows:

Amplifier 34, limiting amplifier 37, detector 38, valve 39 and crater tube 35 are switched on and driving motor 7 is running at synchronous speed. Selector arms RLC.1 and RLC.2 are in position 1 and solenoid S1 is energized. When a picture carrier arrives it causes limiting amplifier 37 to produce an output signal which is applied to detector 38. The output of detector 38, applied through R and C to the grid of valve 39, results in a gradual increase in anode current which eventually operates relay RLA/1 causing contact RLA.1 to change over. This allows the selector switch to operate and arms RLC.1 and RLC.2 move, but are held at position 2 since contact RLB.1 is closed. The receiver is now ready to receive a picture.

The picture carrier transmitted initially corresponds to white, i. e., it is of maximum amplitude. When the transmitter drum begins to rotate, a phasing pulse is transmitted at a predetermined point of each revolution. The phasing pulse consists of a short "black" signal and this causes relay RLB/1 (which is an ordinary non-polarized high-speed telegraph relay) to operate and open contact RLB.1. The opening of this contact releases selector arms RLC.1 and RLC.2 which move into position 3 or 4 depending upon the state of switches SW1 and SW2. (Relay RLB.1 will continue to operate at each change from white to black but it has no further effect once arms RLC.1 and RLC.2 have moved past position 2; it may, if desired, be switched out.) Clutch solenoid S1 is de-energized and traverse solenoid S2 is energized. Solenoid S1 operates dog-clutch 22 to start rotation of driving shaft 4, and solenoid S2 moves mask 24 to allow pawl 16 to engage ratchet wheel 15 and the movement of mask 24 opens shutter 25. When transmission of the picture is complete, the carrier will normally be switched off, and after the delay due to the time constant of C and R, relay RLA/1 allows contact RLA.1 to return to its normal position. The selector then allows arms RLC.1 and RLC.2 to continue to position 1 when solenoid S1 is energized, and S2 is deenergized, and the receiver is ready to receive the next picture.

The first stage in transmitting a picture is to send a phasing pulse which operates phase relay RLB.1 and allows selector arms RLC.1 and RLC.2 to move into position 3 and 4. The clutch solenoid S1 is de-energized and traverse solenoid S2 is energised, solenoid S1 operates dog-clutch 22 to start rotation of driving shaft 4 and solenoid S2 moves mask 24 to allow pawl 16 to engage ratchet wheel 15 and the movement of mask 24 opens shutter 25. When transmission of the picture is complete, the carrier will normally be switched off and after the delay due to the time constant of R and C relay RLA/1 allows contact RLA.1 to return to its normal position. The selector then allows arms RLC.1 and RLC.2 to continue to position 1 when solenoid S1 is energised and S2 is de-energised and the receiver is ready to receive the next picture.

The purpose of switches SW1 and SW2 is as follows:

At the beginning of the traverse of carriage 12 (carriage 12 to the left) for the first picture, SW1 is held in the open position by cam 40. Upon the arrival of the carrier RLA/1 operates contact and upon receipt of a phasing signal RLB/1 operates as previously described. Since SW1 is open, RLC.1 and RLC.2 move through position 3 on to position 4. The transmission then proceeds and the picture is recorded. If the carrier is switched off at the end of the picture RLA/1 operates (after a delay) and RLA.1 returns to its normal position, allowing RLC.1 and RLC.2 to move through position 5 to position 1. The receiver is then ready for the next picture.

If the carrier is not switched off at the end of the first picture, drum rotation and traverse continue until cam 40 opens SW2 when RLC.1 and RLC.2 move into position 5. Solenoid S1 is energized and S2 is de-energized, drum and traverse are stopped, and shutter 25 is closed to prevent waste of light sensitive material on drum 1. The carrier must be switched off before the next picture can be transmitted and when this occurs RLC.1 and RLC.2 move from position 5 to position 1, when the machine is in readiness for the next picture.

Assuming that the first transmission has been completed, carriage 12 is in the central position and SW2 has been opened by cam 40; then when the carrier is switched on for transmission of the second picture the sequence of events will be as already described, except that RLC.1 and RLC.2 will be held at position 3 since SW1 is closed. If the carrier is switched off at the end of the second picture the machine will be shut down as already described, but if it is left on then traverse and drum rotation continue until cam 40 opens SW3 to release RLC.1 and RLC.2, which then move through positions 4 and 5 to position 1.

If the first picture is short and does not occupy the full amount of traverse of carriage 12 allotted to it and the carrier is switched off at the end of it, the selector will move arms RLC.1 and RLC.2 to position 1 as previously described. When transmission of the second picture commences, switch SW1 will be closed and selector arms RLC.1 and RLC.2 will be held in position 3. Some time after transmission of this picture commences switch SW2 is opened by cam 40 but this will not affect the operation of the receiver.

In Figure 5, the general arrangement is similar to that of the two-picture receiver previously described, but the recording drum 1 is made smaller in diameter and the arrangement of switches SW1 and SW2 is altered. Change-over switches are used, mounted on carriage 12 and operated by a step cam 41, attached to the frame of the receiver, through levers 42, 43.

Cam 41 is arranged so that as carriage 12 traverses from left to right SW1 is always changed over before SW2. The steps of cam 41 are positioned so that at the commencement of the first and third pictures (see phantom showing of carriage 12 at commencement of first picture) SW1 is "in" and SW2 is "out" and at the commencement of the second picture SW1 is "out" and SW2 is "in."

As shown in Figure 6 the selector switch has six positions and the operation is as follows:

When the carrier is received relay RLA/1 is operated by the signal from detector 38. This operates contact RLA.1 and selector arms RLC.1 and RLC.2 move to position 2. On receipt of phasing pulse, relay RLB/1 operates and contact RLB.1 opens allowing contact arms RLC.1 and RLC.2 to move. If the picture commences at the beginning of a picture space and SW1 and SW2 are in opposite directions, i. e. one "in" and one "out," then RLC.1 and RLC.2 move into position 4. Shortly after commencement of recording SW2 is moved to its other position and RLC.1 and RLC.2 move to position 5 but this does not affect the operation of the receiver. If a short picture is recorded and recording of a second picture commence before the end of the picture space then SW1 and SW2 will be in similar positions, i. e. both "in" or both "out." RLC.1 and RLC.2 are then held at position 3 and as SW1 and SW2 are changed in sequence by cam 41 when passing the end of the picture space RLC.1 and RLC.2 are moved in sequence to position 4 and position 5 but this does not affect the operation of the receiver.

If, on completion of a transmission, the carrier is switched off then RLA.1 changes over and RLC.1 and RLC.2 move stepwise to position 1 and the receiver is ready for the next picture. If, on completion of a transmission, the carrier is not switched off then the carriage 12 continues to traverse until SW1 is changed over the next step on cam 41, i. e. the end of the picture space, when RLC.1 and RLC.2 are allowed to move to position 6 and solenoid is S1 energised and S2 is de-energised to stop drum 1 and leadscrew 14. When the carrier is eventually switched off RLC.1 and RLC.2 move to position 1.

The method of control shown in Figures 5 and 6 may be used for any machine intended to record two or more pictures.

The foregoing description covers receivers in which the picture space is divided for a stated number of pictures and automatic controls are provided to take care of variations in routine at the transmitting end. For certain applications of the receivers described herein such refinements are not required and the selector switch and switches SW1 and SW2 may be omitted.

Clutch and traverse solenoids S1 and S2 may be operated directly by relay RLB/1 having suitable contacts and interconnected with relay RLA/1 so that once RLB/1 is operated by the phasing pulse it is held in the operated position until released by RLA/1, which will release when the carrier is switched off. Any number of pictures may then be recorded, until the drum is full.

Thus as shown in Figure 7 the clutch and traverse solenoids S1 and S2 are operated directly by contact RLB.2 of phase relay RLB/1. When the detector relay RLA/1 operates on the arrival of a carrier it closes contact RLA.1. When the phasing pulse arrives, relay RLB/1 operates and contact RLB.1 closes a circuit through RLA.1 and an auxiliary coil on RLB/1. This holds RLB/1 in the operated position until RLA.1 releases on cessation of the carrier.

In Figure 8 the same object is achieved but instead of using an auxiliary coil on relay RLB/1, two sets of contact are fitted to the traverse solenoid S2 which thus functions as a relay as well.

I claim:

1. A facsimile receiver of the kind referred to including a recording drum, sufficiently long to enable a plurality of pictures to be recorded, means operable on receipt of a carrier signal to prepare the receiver to receive a picture, means subsequently operable on receipt of a phasing pulse to set the receiver in operation to record a picture over one part of the drum and means operable on the cessation of the carrier signal to stop the recording operation and restore the receiver into the condition in which it is ready to receive the next picture over an adjacent part of the drum.

2. A facsimile receiver of the kind referred to comprising synchronous driving means, a recording drum sufficiently long to enable a plurality of pictures to be recorded adapted to be driven from the driving means, a scanning head, means for relative traversing of the drum and scanning head, means for coupling the driving means to drive the traversing means, means operable on receipt of a starting signal for operating the coupling means for recording a picture over one part of the drum and means operable when a picture has been recorded for releasing the coupling means.

3. A facsimile receiver as claimed in claim 1 in which the release means is operated at predetermined positions in the relative traverse of the drum and scanning head.

4. A facsimile receiver as claimed in claim 2 comprising means for coupling the driving means and the drum and means for operating this coupling means on receipt of the starting signal and for releasing it when a picture has been recorded.

5. A facsimile receiver of the kind referred to including a recording drum, sufficiently long to enable a plurality of pictures to be recorded, and automatic means for starting and stopping the receiver at the beginning and end of each picture, including a light-tightt box enclosing the recording drum which carries light-sensitive material and a controlling shutter on said box.

6. A facsimile receiver including a recording drum, a recording head, means for traversing said recording head along said drum to record a plurality of separate pictures upon a sheet carried by said drum, and signal controlled means responsive to reception of a recording signal for automatically starting and stopping said receiver at the beginning and end respectively of each separate picture transmission.

7. A facsimile receiver in accordance with claim 6, in which said receiver includes a light-tight housing for said drum, said housing being apertured to admit light emanating from said recording head during its traverse, a shutter normally closing the aperture of said housing, and means responsive to reception of a signal for opening said shutter.

8. A facsimile receiver in accordance with claim 6, including switches controlled by said recording head during its traverse, and means controlled jointly by said switches and by said signal controlled means for traversing said recording head to a predetermined subsequent position after completion of one picture transmission to prepare for the recording of the next picture.

9. A facsimile receiver in accordance with claim 6, in which said signal controlled means includes a selector switch connected to energize operation-controlling circuits in accordance with the reception of carrier signals and picture signals.

No references cited.